T. BRUCKNER.
FELLY FOR WHEELS WITH PNEUMATIC TIRES.
APPLICATION FILED NOV. 9, 1906.
925,560.
Patented June 22, 1909.
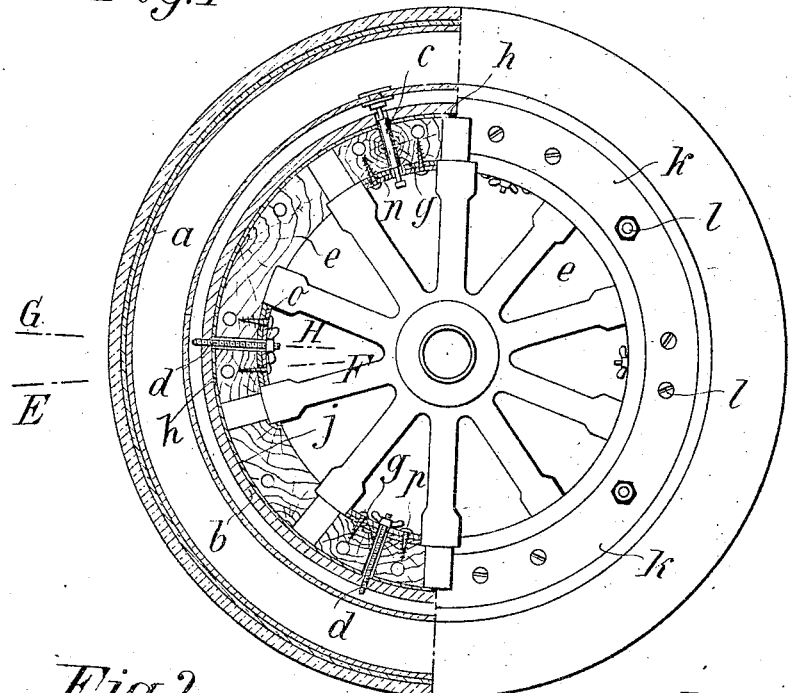
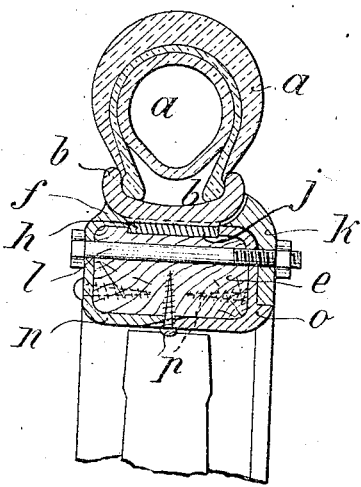
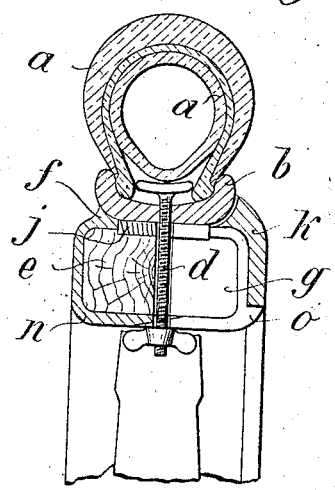
Witnesses:
Inventor:
Theodor Bruckner

UNITED STATES PATENT OFFICE.

THEODOR BRUCKNER, OF VIENNA, AUSTRIA-HUNGARY.

FELLY FOR WHEELS WITH PNEUMATIC TIRES.

No. 925,560.  Specification of Letters Patent.  Patented June 22, 1909.

Application filed November 9, 1906. Serial No. 342,609.

*To all whom it may concern:*

Be it known that I, THEODOR BRUCKNER, subject of the Emperor of Austria-Hungary, residing at Vienna, Austria-Hungary, have invented certain new and useful Improvements in Fellies for Wheels with Pneumatic Tires, of which the following is a specification.

This invention relates to a rim for wheels with pneumatic tires, in particular for automobile wheels in which the pneumatic tire is fitted upon a wheel-rim that is adapted to be slid together with the air valve and the screws for fastening the pneumatic tire, laterally upon the felly and is held rigidly fast between two annular flanges; of these flanges the interior flange forms one piece with the felly whereas the exterior flange constitutes a flanged ring that can be detachably connected with the felly.

The invention has for its purpose the strengthening of the felly at those places in which radial slits must be provided for the reception of the screws for attaching the pneumatic tire and of the air valve in order to enable the easy and unobstructed application and removal of the wheel rim.

According to the present invention and in contradistinction to the known arrangements the parts above referred to that are weakened by the slits are strengthened by means of angle-iron pieces the outer extremities of which are bent around and down upon the felly while their interior extremities overlap each other. The angle irons are fitted on the felly while they are in a heated condition and form a protecting iron covering inseparably connected with the felly. The interior angle iron forms part of the interior annular flange whereas the outer angle iron constitutes part of the supporting bearing for the removable flanged ring whereby the wheel rim that carries the pneumatic tire is securely and rigidly maintained in position between the two annular flanges.

The accompanying drawings represent a wheel according to the present invention.

Figure 1 shows the wheel in lateral elevation and partly in section and Figs. 2 and 3 represent respectively sectional views on the lines E—F and G—H of Fig. 1.

The pneumatic tire $a$ is fitted upon the iron wheel rim $b$ that can be slid onto the felly $e$. The latter is provided on its interior side adjacent to the carriage with a projecting annular flange forming an inseparable part with the felly whereas on the exterior side it is provided with radial slits $g$ serving for the reception of the air valve $c$ and of the screws $d$ intended for securing the pneumatic tire; in this manner the wheel rim can be easily slid onto the felly $e$. For securing the wheel rim upon the felly and for preventing a turning of the former, it is provided with ribs $h$ engaging corresponding grooves of an iron ring $i$ fastened to the felly. The wheel rim is held rigidly in position by means of an exterior annular flange $k$ removably connected with the felly $e$ by threaded bolts $l$. Those parts of the felly $e$ which are weakened by the said slits $g$ are strengthened by means of angle irons $n$, $o$, the exterior ends of which are bent around and down onto the felly whereas their interior ends form a slanting joint at the interior surface of the felly and consequently these ends overlap each other. At this joint as well as on the side surfaces the angle irons are fastened to the felly by screws $p$. The interior angle iron $n$ constitutes part of the interior annular flange $f$ whereas the exterior angle iron $o$ forms part of the supporting bearing for the annular flange $k$.

The angle irons are slotted or contain openings to allow the valve-stem and security bolts $d$ to be passed into the slots in the felly.

Claim.

In a vehicle wheel the combination with the felly of a removable wheel-rim, adapted to be slid thereon, a pneumatic tire mounted on said wheel-rim, the said felly having slits therein for the reception of screws and the air valve of the pneumatic tire, angle irons secured to the wheel-rim for reinforcing the same, the said angle irons having their outer ends bent around and down onto the felly and their beveled inner ends overlapping each other, forming a slanting joint, a removable annular flange for holding the wheel-rim in position on the said felly and means for securing the said annular flange to the said felly.

In testimony whereof I have hereunto set my hand in presence of two subscribing witnesses.

THEODOR BRUCKNER.

Witnesses:
 JOSEF RUBARCH,
 ALVESTO S. HOGUE.